Aug. 30, 1960   W. F. GOLDING   2,950,915
SHEET FEED AND REGISTRATION APPARATUS
Filed March 25, 1957   7 Sheets-Sheet 1

Inventor
William Frank Golding
by Albert Jacobs
Attorney

Aug. 30, 1960 W. F. GOLDING 2,950,915
SHEET FEED AND REGISTRATION APPARATUS
Filed March 25, 1957 7 Sheets-Sheet 2

Inventor
William Frank Golding
by Albert Jacobs
Attorney

FIG. 4

Aug. 30, 1960 W. F. GOLDING 2,950,915
SHEET FEED AND REGISTRATION APPARATUS
Filed March 25, 1957 7 Sheets-Sheet 4

Inventor
William Frank Golding
by Albert B Jackis
Attorney

Aug. 30, 1960 W. F. GOLDING 2,950,915
SHEET FEED AND REGISTRATION APPARATUS
Filed March 25, 1957 7 Sheets-Sheet 5

Aug. 30, 1960 W. F. GOLDING 2,950,915
SHEET FEED AND REGISTRATION APPARATUS
Filed March 25, 1957 7 Sheets-Sheet 6

FIG. 10

Inventor
William Frank Golding
by Albert B Jacobs
Attorney

Aug. 30, 1960    W. F. GOLDING    2,950,915
SHEET FEED AND REGISTRATION APPARATUS
Filed March 25, 1957    7 Sheets-Sheet 7

United States Patent Office 2,950,915
Patented Aug. 30, 1960

2,950,915

SHEET FEED AND REGISTRATION APPARATUS

William Frank Golding, 22 Parry's Close, Bristol, England

Filed Mar. 25, 1957, Ser. No. 648,369

Claims priority, application Great Britain Mar. 28, 1956

10 Claims. (Cl. 271—50)

This invention relates to sheet feed and registration apparatus of the kind comprising a frame supporting an endless chain conveyor which is periodically halted for a sheet gripping device provided on the conveyor to be held still in two or more operating positions along a working run of the conveyor.

The object of this invention is to provide improved means for the accurate registration of the gripping device in said operating positions.

According to this invention a sheet feed and registration apparatus of the kind described is characterised in that the sheet gripping device is mounted on the conveyor through the intermediary of means permitting the gripping device to move relative to the conveyor in the direction of travel thereof, and that there are provided at each of said at least two operating positions of the gripping device a positioning means for moving the gripping device relative to the conveyor into a registering position, the positioning means being timed to act on the gripping device substantially during the stationary period of the conveyor.

Also according to this invention there may be provided a sheet feed and registration apparatus for a machine required to perform on successive sheets an accurately registered operation, the apparatus comprising two parallel endless chains supported on the frame of the machine and constituting a conveyor, means for driving the chains in an intermittent and uni-directional motion, sheet gripping devices disposed between the chains at regular intervals along the lengths thereof, the conveyor having a working run in which each gripping device is presented and held still in succession in three operating positions which are a first or sheet receiving position, a second or sheet working position and a third or sheet discharging position, at the sheet receiving position lay means provided on the frame for laying a sheet, means for actuating each gripping device presented at the sheet receiving position to grip the sheet there laid, means for actuating each gripping device presented at the sheet discharging position there to let go the sheet, guide means seating each gripping device on the conveyor and constraining the gripping device for a limited amount of movement relative to the conveyor in the direction of travel thereof, resilient means for pressing each gripping device along said guide means forwards in respect of the sense of travel of the conveyor, at each of said sheet receiving and sheet working positions a positioning member supported on the frame, means for imparting to each positioning member a reciprocating operative and return movement timed so that substantially during the stationary and the moving period of the conveyor the positioning members are situated respectively in an operative position intercepting the path of travel of the gripping devices and in a returned position clear of the path of travel of the gripping devices, the positioning members being so situated that towards the end of their operative movement they abut the respective gripping devices and move them backwards against the pressure of said resilient means into a position determined by the operative position of the positioning members, all whereby there is established in respect of longitudinal register a fixed relationship between the position of a sheet laid at said sheet receiving position and the position of the same sheet held at said sheet working position, said relationship being fixed relative to the lay means and independent of the conveyor.

Although in many cases it is preferred for the gripping device to be moved relative to the conveyor opposite to the sense of travel thereof, it is possible to arrange the apparatus for the gripping device to be moved relative to the conveyor in the sense of travel thereof.

Examples of the apparatus according to this invention will now be described with reference to the accompanying drawings wherein.

Figure 1:
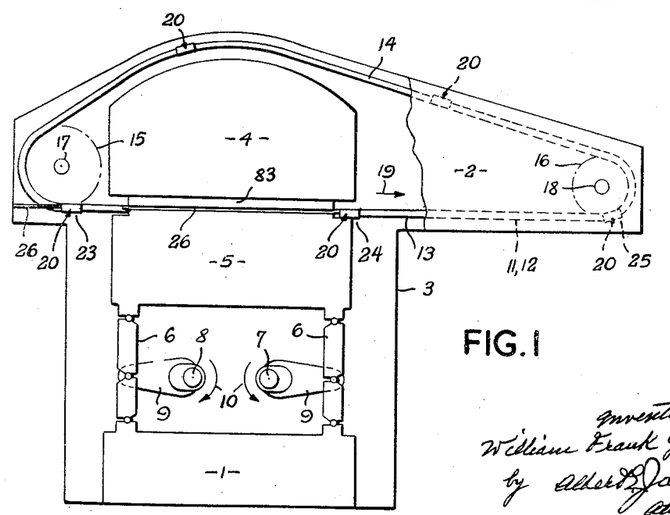
Fig. 1 is a diagrammatic elevation of the right hand side of a cutting, creasing and embossing press for cardboard blanks, one of the side frames of the press being partly removed.

Referring to Fig. 1 the press comprises a base 1, two upstanding side frames 2, 3 secured to the base 1, a stationary platen 4 secured to the side frames 2, 3 therebetween, a movable platen 5 vertically slidable between the side frames 2, 3 and supported on the base by means of toggles 6, and crankshafts 7, 8 connected to the toggles 6 by connecting rods 9 so that rotation of the crankshafts 7, 8 causes the toggles 6 to flex and thereby raise and lower the platen 5. Arrows 10 indicate the direction of rotation of the crankshafts 7, 8. In the illustrated position the platen 5 is at the top of its stroke, i.e. closest to the platen 4. A press as aforesaid is shown in my co-pending application Serial No. 593,606, filed June 25, 1956.

Referring now also to Figs. 2 to 8, a sheet feeding means comprises two parallel endless chains 11, 12 constituting a conveyor and having a working run 13 substantially at the level of the working gap between the platens 4, 5 and a return run 14 above the working run 13, the chains being supported on sprockets 15, 16 disposed at the ends of the working run 13 and secured to transverse shafts 17, 18 journalled in the side frames 2, 3. A plurality of gripping devices 20 are provided on the chains 11, 12 at regular spacing at regular intervals therealong and at a spacing greater than the width of the platens 4, 5 as defined by the extent in the direction of travel of the chains of a die or cutting form 83 secured to the platen 4, each gripping device 20 comprising a bar 21 extending transversely between the chains 11, 12 and provided with gripper jaws 22, Fig. 4. The crankshaft 8 is associated with means for imparting to the chains 11, 12 an intermittent uni-directional motion the stroke of which is substantially equal to the spacing of the gripping devices 20 and the timing of which is that the chains 11, 12 stand still substantially for 180° of crank shaft rotation and that each gripping device 20 is presented and held stationary in succession in three operating positions which are a first or sheet receiving position 23 at the rear of the platens 4, 5, a second or sheet working position 24 immediately to the front of the platens 4, 5 and a third or sheet discharging position 25 further in front of the platens 4, 5. The sense of travel of the chains 11, 12 is indicated by the arrow 19.

At the sheet receiving position 23 there is provided above the position occupied by the gripping device 20 a bar 27 provided with members 28 defining a longitudinal lay means and members 29 defining a gripper operating means. When the bar 27 is lowered the members 29 co-operate to open the gripper jaws 22 and the members 28 are positioned for a sheet 26 to be laid thereagainst. Raising of the bar 27 causes the jaw 22 to close and the members 28 to be withdrawn. Further gripper operating members (not shown) are of course provided at the sheet discharging position 25.

Means (not illustrated) for operating the bar 27 are timed to raise and lower the bar 27 substantially when the chains 11, 12 stand still. A sheet feeding means as aforesaid is disclosed in my co-pending application Serial No. 601,266 filed July 31, 1956.

A sheet registration apparatus comprises means for moving the gripping devices 20 relative to the chains 11, 12 into a registering position, i.e. moving the sheet 26 into registration with the cutting form 83 secured to the platen 4. The drawings show the position of the apparatus when the gripping devices have been so moved.

Figure 4:
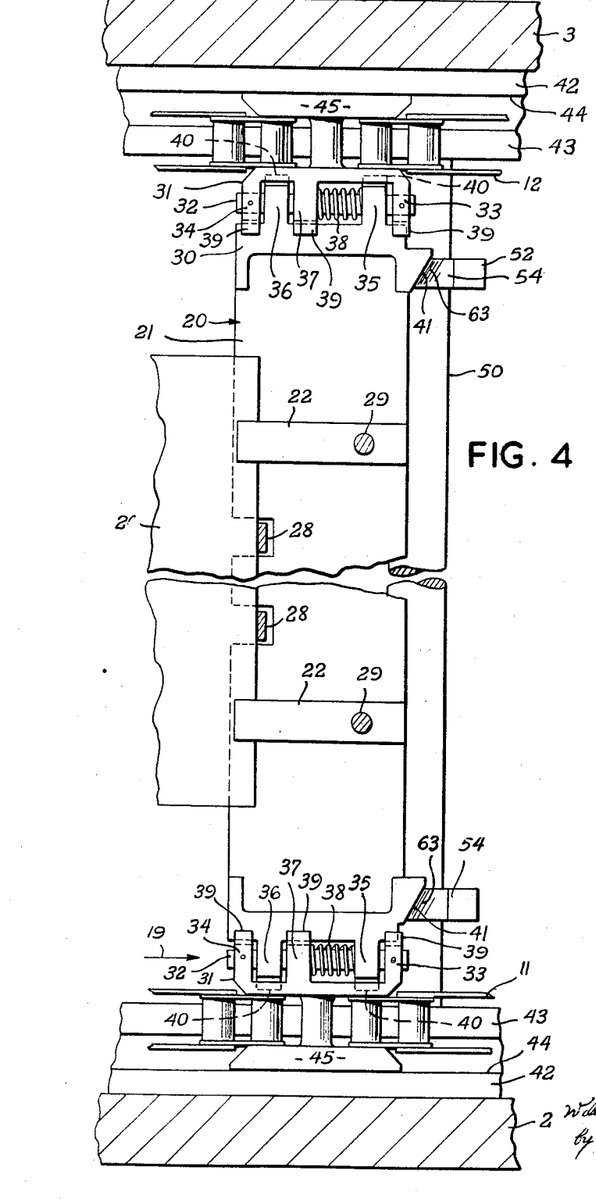
Fig. 4 is a section on the line IV—IV in Fig. 2.
Figure 5:
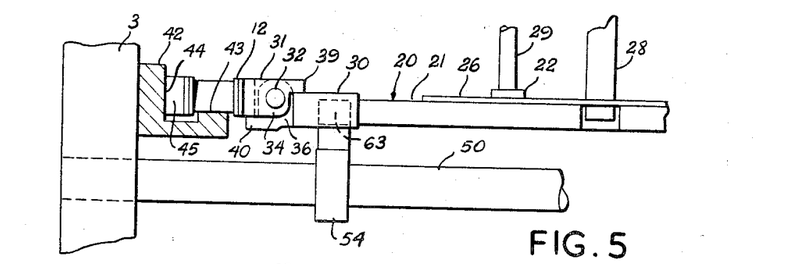
Fig. 5 is an enlarged detail of Fig. 3.

Referring particularly to Fig. 4, the bars 21 of the gripping devices 20 comprise at each end a slide element 30 disposed on a guide element provided on a bracket or link 31 secured to the adjacent chains 11, 12. Each guide element consists of a round pin 32 secured to and extending between two spaced apart end lugs 33, 34 on the bracket, the pin 32 being disposed inwardly of the chains 11, 12 and parallel thereto. Each slide element 30 has the form of two spaced bearings 35, 36 both seated on the pin 32 between the lugs 33, 34 of the bracket 31. The bracket 31 is provided with a further or medial lug 37 disposed between the bearings 35, 36 and a helical compression spring 38 surrounding the pin 32 and situated between the medial lug 37 and the leading bearing 35 (having regard to the sense of travel of the device 20) presses the leading bearing 35 and thus the bar 21 forwards towards a stop constituted by the leading lug 33 of the bracket.

To prevent the element 30 and the bracket 31 from pivoting about the axis of the pin 32, the lugs 33, 34, 37 are each provided with an extension 39 bearing on the element 30 and the bearings 35, 36 are each provided with an extension 40 bearing on the bracket 31. The elements 30 are each provided with an abutment surface 41, both surfaces 41 extending forwards and to the left (having regard to the sense of travel of the chains 11, 12). For the whole of the working run 16 of the chains 11, 12 there is provided for each of the chains a track 42 secured to the adjacent one of the side frames 2, 3, each track 42 comprising a bottom track surface 43 for the chain rollers and a lateral track surface 44. Each of the brackets 31 comprises a shoe 45, positioned to slide along the adjacent track surface 44, the distance between the opposite surfaces 44 being arranged to provide a lateral running clearance for the gripping device 20.

Figure 2:
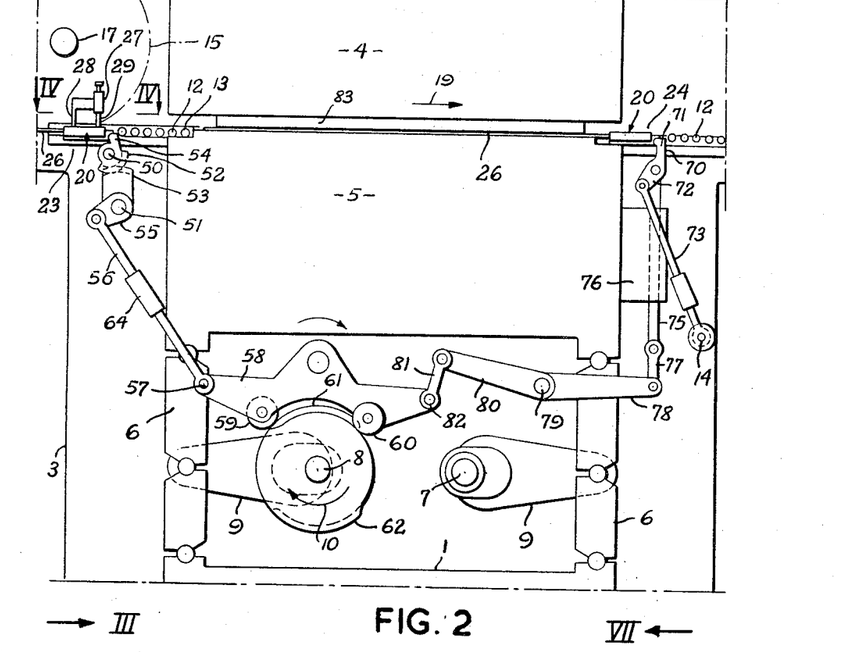
Fig. 2 is an enlarged part view of Fig. 1 showing an example of the apparatus according to this invention.
Figure 3:
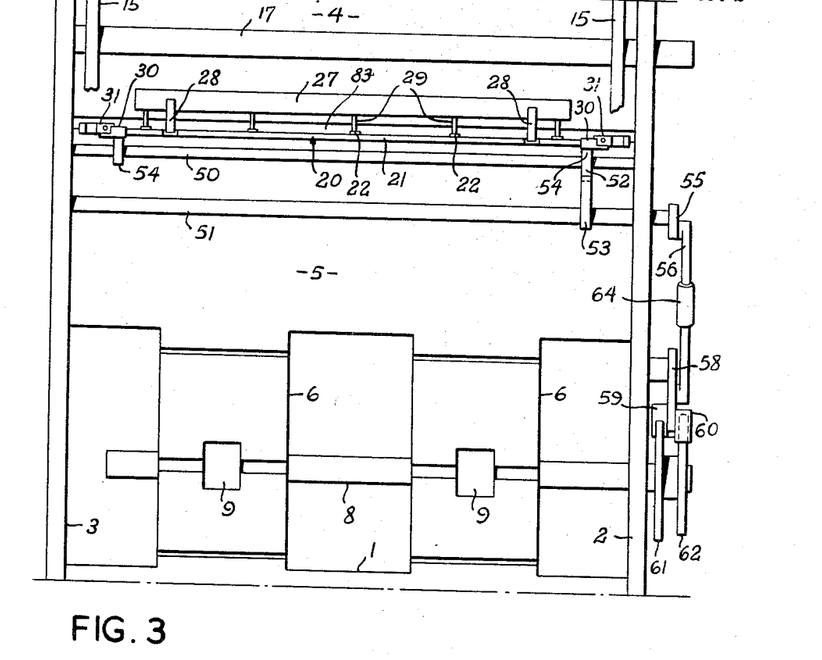
Fig. 3 is a view in the direction of the arrow III in Fig. 2.

At the sheet receiving position 23 of the gripping devices 20, Figs. 2 and 3, there are disposed below the working run 13 of the chains 11, 12 two quadrant shafts 50, 51, one disposed above the other and connected by meshing toothed gearing quadrants 52, 53, the quadrant 53 on the lower shaft 51 having the larger pitch circle radius to provide a step up gearing between the shafts 51, 50. The shafts 50, 51 are journalled in bearings in the side frames 2, 3 and extend transversely to the chains 11, 12. The quadrant shaft 50 has secured thereto two spaced apart single-ended positioning levers 54, one of the levers 54 being integral with the quadrant 52. The lower quadrant shaft 51 has secured thereto a lever 55 connected by a pivotal link 56 to one end 57 of a double ended rocker 58 provided with two follower elements 59, 60 contacted respectively by two cams 61, 62 secured to the crank shaft 8, the rises of each of the cams 61, 62 being spaced apart by 180° and their relation with the follower elements 59, 60 being such that the rocker 59 is tilted from the one to the other pivotal position every 180° of crank shaft rotation but otherwise held still.

Each lever 54 is provided at the free end thereof with a part-cylindrical surface 63 extending (in the illustrated position of the levers 54) parallel to the abutment surfaces 41 of the elements 30, Fig. 4.

Figure 6:
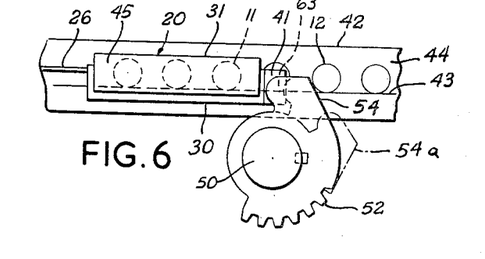
Fig. 6 is an enlarged detail of Fig. 2.
Figure 7:
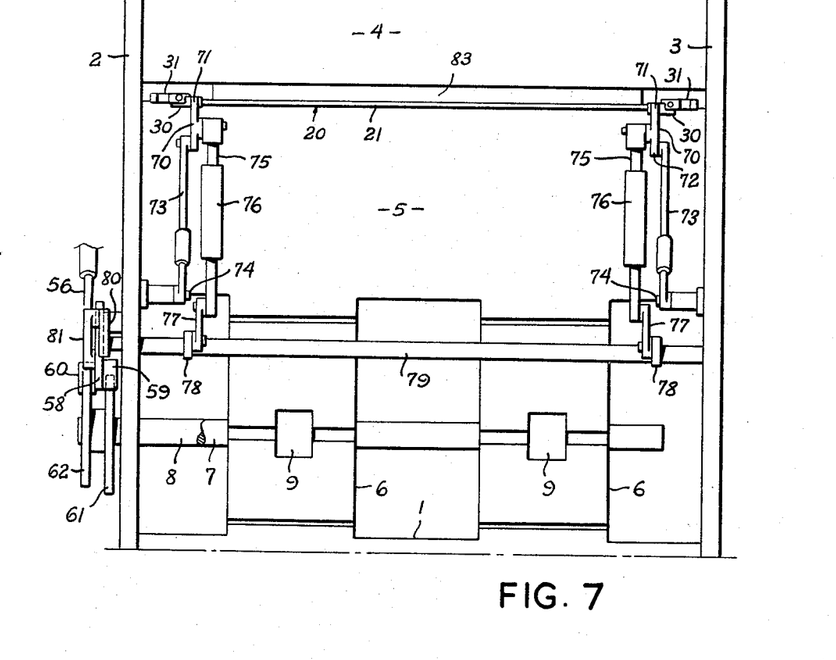
Fig. 7 is a view in the direction of the arrow VII in Fig. 2.

The reciprocating motion of the rocker 58 is transmitted to the positioning levers 54 by said link 56 and quadrants 52, 53 and the ratio of transmission is such that the levers 54 are pivoted through about 45° between a substantially vertical position and an inclined position denoted 54a, Fig. 6. In the substantially vertical or operative position the free ends of levers 54 are disposed in the path of travel of the gripping device 20 while in the inclined or returned position the levers 54 are clear of the path of travel of the device 20.

The timing of the rocker 58 is such that the positioning levers 54 are moved into the operative position substantially at the beginning and are returned substantially at the end of the stationary phase of the chains 11, 12. The bar 27 is timed to close the gripper jaws 22 prior to the return of the levers 54.

The positioning levers 54 are so situated that towards the end of their operative movement their surfaces 63 abut the surfaces 41 of the gripping device 20 situated in the sheet receiving position 23 at the time, and push the device 20 backwards against the pressure of said springs 38 into a position having a fixed relation to the side frames 2, 3 and being independent of the chains 11, 12. In other words, when in their operative position the levers 54 have corrected the position of the gripping device 20 from any inaccuracies arising from the chains 11, 12 into a fixed position relative to the lay members 28 and the registration of successive gripping devices 20 with the sheets 26 gripped by them is constant. The amount of correction made in this manner need rarely exceed say 1/16 inch and is determined entirely by the operative position of the levers 54. Means for adjusting the amount of correction may comprise means for adjusting the length of the link 56 by means of a turnbuckle 64.

The surfaces 41 and 63 define a ramp means and their co-operation causes the gripping device 20 to be pushed towards one side of the press so that when the levers 54 act on the gripping device 20 to correct the longitudinal position thereof the force exerted by the levers 54 has a transverse component causing the clearance between the surfaces 43 of the opposite tracks 42 to be taken up by the shoe 45 adjacent the chain 12 to be pressed against the adjacent surface 44.

The clearance between the gripping device 20 and the opposite surfaces 43 may be relatively small, say .01 inch, and is easily taken up without materially effecting a relatively larger correcting movement in the longitudinal direction, i.e. the direction of the pins 32.

At the sheet working position 24 of the gripping devices 20 there are provided two positioning levers 70 each constructed as a bell crank lever one arm 71 of which is situated to perform the positioning or correcting operation while the other arm 72 is connected by a retaining link 73 pivoted to a stationary pin 74 on the adjacent side frame 2, 4. Each lever 70 is pivoted to the top of a slide member 75 seated for vertical movement in a guide member 76 secured to the adjacent end of the lower platen 5, and the bottom end of each slide member 75 is connected through a pivotal link 77 to a lever 78 secured to a shaft 79 journalled in the side frames 2, 3. A lever 80 secured to the shaft 79 is connected through a pivotal link 81 to said rocker 58 at the end 82 thereof.

The arrangement is such that movement of the rocker 58 causes the slide members 75 supporting the levers 70 to raise and lower, the raising movement causing the levers 70 to be raised and simultaneously pivoted into the operative position by virtue of the connection to the retaining link 73.

The link 73 defines a means for pivoting the lever 70 when the slide member 75 is moved towards and away from the sheet working position 24 of the gripping device 20. As a result, the movement of the lever 70 is a compound of its pivotal movement and of the movement of the slide member 75. This brings about a rapid change of position of the ends 71 of the levers 70 which is desirable inasmuch as the arms 71 have to be rapidly withdrawn from the operative position so as not to be in the way of the gripping device 20 when the latter is sharply accelerated when the chains 11, 12 start moving.

Figure 8:
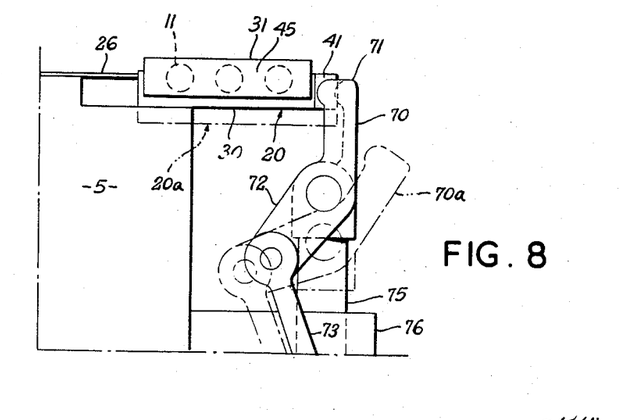
Fig. 8 is an enlarged detail of Fig. 2.

Also, said compound movement provides for a relatively large movement of the ends 71, i.e. during the return movement into the inoperative position indicated 70a, Fig. 8, the levers 70 are withdrawn a relatively long distance downwards from the operative position. This is desirable for the following reason. During their journey between the positions 23, 24 the gripping devices must be sufficiently low to clear the upper platen 4 with the consequence that when the lower platen 5 is raised for the working of the sheet 26 and the latter is raised thereby into contact with the upper platen 4, the gripping device 20 has to be raised also to prevent tearing of the sheet 26. Therefore a relatively long journey is necessary for the ends 71 of the levers 70 in order, on the one hand, to contact the gripping device 20 when the latter is raised as aforesaid, and on the other hand, to be clear of the gripping device 20 when the latter is lowered again prior to being moved to the position 25. The drawings show the gripping device 20 in the raised position and the lowered position is indicated at 20a in Fig. 8. Said raising and lowering of the gripping devices 20 is known as per se.

The extremities of the arms 71 are of course provided with part-cylindrical surfaces similar to the surfaces 63 of the levers 54.

The positioning levers 54, 70 at the sheet receiving and sheet working positions 23, 24 act in succession upon each gripping device 20 as it passes through the working run 13 and by the action of the correcting levers 54, 70 there is established a fixed relationship between the position at which the sheets 26 are laid and the position at which they are worked independent of any inaccuracies produced by the chains.

Referring to Figs. 9 to 12, there is secured to the crank shaft 7 a track cam 90 engaged by a roller 91 on a follower bar 92 which is supported at one end in a die 93 on crank shaft 7 and which is pivoted at the other end to a lever 94 secured to a shaft 95 extending between the side frames 2, 3 and journalled therein. The cam 20 is shaped for the follower bar 92 to make one reciprocation during one revolution of the crank shaft 7. The shaft 95 is situated below the sheet working position 24 of the gripping devices 20 and has secured thereto two levers 96 connected by links 97 to the bottom ends of slide members 75 analagous to the slide members 75 described with reference to Figs. 2 to 8 and correspondingly provided with correcting levers 70 associated with retaining links 73. Further the shaft 95 has secured thereto a lever 98 connected by a link 99 to a lever 100 secured to a shaft 101 extending between the side frames 2, 4 and journalled therein. The shaft 101 is situated substantially below the sheet receiving position 23 of the gripping devices 20 and above the shaft 101 there are secured to the lower platen 5 two guide members 102 similar to the guide members 76 and supporting slide members 75 provided with correcting levers 70 associated with retaining links 73 analagous to the similar members 75, levers 70 and links 73 provided at the sheet working position 24. The shaft 101 has secured thereto two levers 103 connected by pivotal links 104 to the bottom of the adjacent slide members 75.

It will be appreciated that the timing of the levers 54, 70 may be such that they reach the operative position slightly before the chains 11, 12 stand still, and in this case the levers 54, 70 would stand still while the gripping devices 20 are moved thereagainst during the last part of the chain movement, i.e. the levers 54, 70 would then act as stationary abutments. However, the return movement of the levers 54, 70 must of course be timed to commence not later than the commencement of the chain movement.

Figures 9, 11, 12:
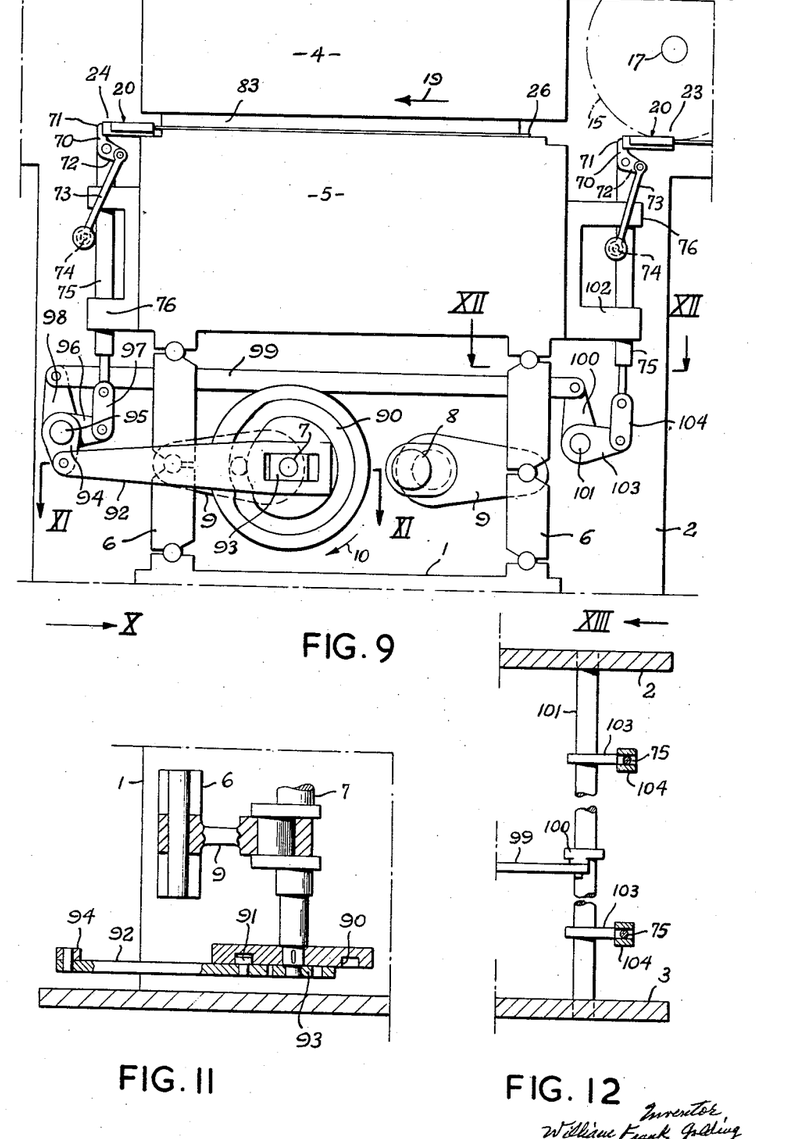
Fig. 9 is a view similar to Fig. 2 but showing the left hand side of the press and showing a modification.
Fig. 11 is a section on the line XI—XI in Fig. 9.
Fig. 12 is a section on the line XII—XII in Fig. 9.
Figure 10:
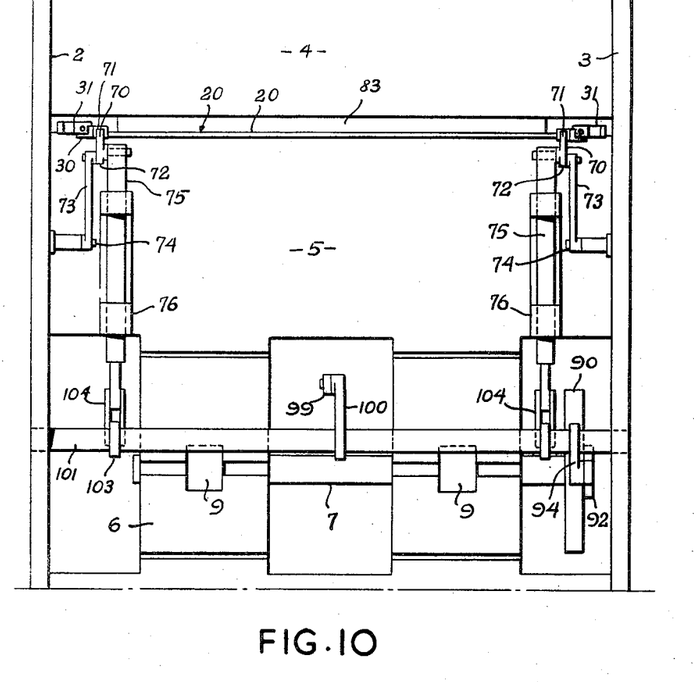
Fig. 10 is a view in the direction of the arrow X in Fig. 9.
Figure 13:
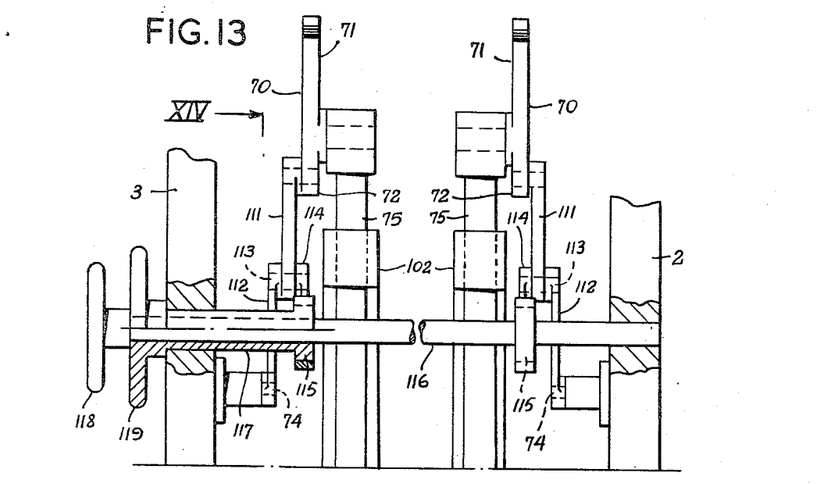
Fig. 13 is an enlarged view in the direction of the arrow XIII in Fig. 9, but showing a modification.
Figure 14:
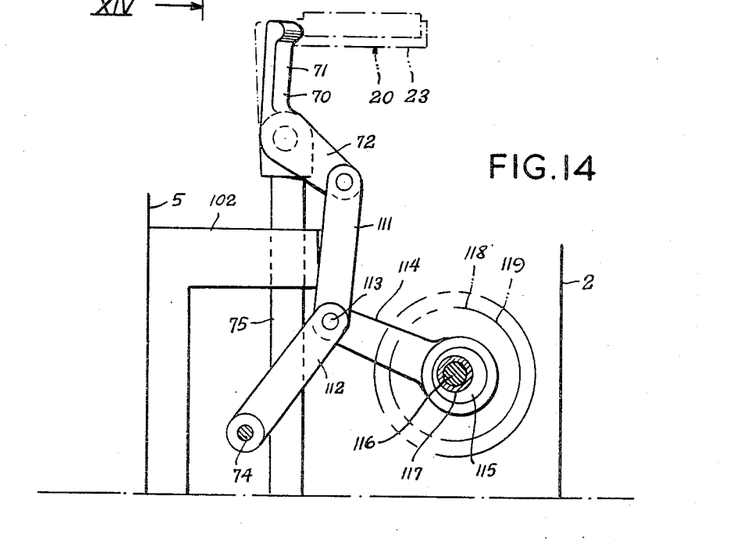
Fig. 14 is a section on the line XIV—XIV in Fig. 13.

Referring to Figs. 13 and 14, there are shown the positioning levers 70, slide members 75, and guide members 102 substantially as shown in Fig. 9, but the retaining links 73 are replaced by toggles defining a means for adjusting the distance between the pins 74 and the arms 72 of the levers 70, i.e. defining a means for adjusting the operative positions of the levers 70. Each toggle comprises two links 111, 112 pivoted together by a pin 113. At their ends remote from the pin 113, the links 111 and 112 of each toggle 110 are pivoted respectively to the arm 72 of the adjacent lever 70 and to the adjacent pin 74. Each pin 113 is connected by a connecting rod 114 to an eccentric 115, one of the eccentrics 115 being secured to a shaft 116 while the other eccentric 115 is secured to a tube 117 concentrically surrounding the shaft 116. The shaft 116 and tube 117 are journalled in the side frames 2 and 3, respectively. Outside the side frames 2, 3 the shaft 116 and tube 117 have secured thereto hand wheels 118 and 119, respectively. It will be seen that rotation of the eccentrics 115 causes the toggles 110 to flex, thus causing the distance between the pins 74 and the arms 72 to be varied, whereby the operative positions of the two levers 70 may be adjusted independently by rotation of the handwheels 118 and 119, respectively. The hand wheels 118, 119 form a means for adjusting the operative position of the levers 70, and thus the register of the sheets 26, at a convenient point outside the frames 2, 3 remote from any moving parts of the press (particularly the chains 11, 12) and the press need not be stopped for this adjustment to be made.

As will be seen from the position of the eccentric 115 in Fig. 14, the levers 70 are in the position giving the greatest amount of positioning movement to the gripping device 20, the links 111, 112 forming the smallest possible angle between them. When the hand wheels 118, 119 are rotated the toggles 110 are extended for the links 111, 112 to adopt a larger angle between them, the distance between the arms 72 and the pins 74 is increased and a lesser amount of positioning movement is imparted to the gripping device 20. Since the arrangement is provided at the sheet receiving position 23 then if in operation it is found that the sheet over-travels the cutting form 83, the sheet 26 is brought back into register by extension of the toggles 110, under-travelling of the sheet 26 being correspondingly corrected by contraction of the toggles 110. In this it is assumed that the positioning levers 70 at the sheet working position 24 have remained undisturbed. It will be appreciated that the arrangement of the toggles may of course also be provided at the sheet working position 24 where any over-travel of the sheet 26 is to be corrected by contraction of the toggles. Adjustment of the sheet 26 for angular register is of course carried out by independent operation of either of the wheels 118, 119.

The terms "over-travelling" and "under-travelling" relate, in this context, to small inaccuracies in the register of the sheet 26 after the gripping device 20 has been positioned by the levers 70 at the sheet working position 24.

Releasable means (not shown) are provided for locking the shaft 116 and the tube 117 against rotation. The hand wheel 118 may be releasably locked to the hand wheel 119 so that both levers 70 are moved simultaneously by rotation of the hand wheel 119 while the shaft 116 may be rotated independently for adjustment of the angular register.

Instead of employing a tube and shaft arrangement as shown, the eccentrics 115 may be provided on two separate parallel shafts so that either of the levers 70 may be adjusted by rotation of the appropriate shaft.

What I claim and desire to secure by Letters Patent is:

1. A press for working on sheets comprising a fixed platen, a movable platen, two parallel endless chains, a supporting bar extending transversely between said chains the bar being provided with means for gripping a sheet, substantially rectilinear tracks positioned to support the chains during a run including the passage of the bar from one operating position through between the platens to another operating position, said chains being driven with an intermittent motion timed for the bar to stand still when situated in the operating positions, a guide element connected to a link of each of the chains, the guide elements being engaged by the ends of the bar and being dimensioned to guide the bar for rectilinear movement parallel to the pitch line of the chains, and positioning means provided at each operating position of the bar and cooperating to move the bar along the guide elements into a sheet registering position.

2. A press according to claim 1, comprising a resilient member provided between each said link and the bar, the resilient member being positioned to urge the bar along the guide elements in a direction opposite to that in which the bar is moved by said positioning means.

3. A press according to claim 2, wherein the length of said guide element is greater than the extent of said positioning movement, whereby said bar is held between said positioning means and said resilient member when the bar is situated in the sheet registering position.

4. A press according to claim 1 wherein the positioning means at at least one of the operating positions of said bar comprise a positioning member and means for imparting to the positioning member an operating and return movement from a position clear of the path of travel of said bar into a position in the path of travel of the bar and back, the positioning member being situated to abut the bar during the terminating part of the operating movement and to move the bar into said sheet registering position.

5. A press according to claim 1, wherein ramp means are provided between the positioning means and said bar, said ramp means cooperating to impart to the bar a component movement transverse to the direction in which the bar is moved by the positioning means.

6. A press for working on sheets comprising a pair of platens, means for reciprocating one of the platens relative to the other platen thereby to work a sheet positioned between the platens, two parallel endless chains, a plurality of bars extending transversely between the chains and connected thereto at regular intervals and at a spacing greater than the width of the platens, each bar being provided with means for gripping a sheet, sprockets over which the chains are trained and which locate the chains relative to the platens in a position including a run in which the bars are situated in a plane passing between the platens, the chains being moved in the direction of their length with an intermittent motion timed to stop the chains when two successive bars are situated at opposite sides of the platens in operating positions defining a sheet receiving and a sheet working position respectively and timed to move the chains for the bar situated in the sheet receiving position to be moved through between the platens to the sheet working position when the platens are parted during the reciprocation of said one of the platens, each chain including in respect of each bar a link provided on the side facing the space between the chains with a guide element engaged by the adjacent end of the bar and dimensioned to guide the bar for rectilinear movement in the direction of the length of the link, resilient means provided between said links and the bar and cooperating to urge the bar along the guide elements towards one end thereof, and there being provided at each of the operating positions of the bars a means cooperating to move the bar along the guide elements against the action of the resilient means into a sheet registering position.

7. A press for working on sheets comprising a pair of platens, means for reciprocating one of the platens relative to the other platen thereby to work a sheet positioned between the platens, two parallel endless chains, a plurality of bars extending transversely between the chains and connected thereto at regular intervals and at a spacing greater than the width of the platens, each bar being provided with means for gripping a sheet, sprockets over which the chains are trained and which locate the chains relative to the platens in a position including a run in which the bars are situated in a plane passing between the platens, the chains being moved in the direction of their length with an intermittent motion timed to stop the chains when two successive bars are situated at opposite sides of the platens in operating positions defining a sheet receiving and a sheet working position respectively and timed to move the chains for the bar situated in the sheet receiving position to be moved through between the platens to the sheet working position when the platens are parted during the reciprocation of said one of the platens, each chain including in respect of each bar a link provided on the side facing the space between the chains with a guide element engaged by the adjacent end of the bar and dimensioned to guide the bar for rectilinear movement in the direction of the length of the link, resilient means provided between each link and the adjacent end of the bar and positioned to urge the bar along the guide element towards one end thereof, and at each of said operating positions of the bars there being provided near each end of the bar a positioning member, means for moving the positioning members through an operating and return movement timed so that substantially during the stationary and the moving period of the chains the positioning members are situated respectively in an operative position in the path of travel of the bars and in a returned position clear of the path of travel of the bars, the positioning members being so situated that towards the end of their operating movement they engage the respective bars and move them along the guide elements against the action of the resilient means into a sheet registering position.

8. A press for working on sheets comprising a pair of platens, means for reciprocating one of the platens relative to the other platen thereby to work a sheet positioned between the platens, two parallel endless chains, a plurality of bars extending transversely between the chains and connected thereto at regular intervals and at a spacing greater than the width of the platens, each bar being provided with means for gripping a sheet, sprockets over which the chains are trained and which locate the chains relative to the platens in a position including a run in which the bars are situated in a plane passing between the platens, the chains being moved in the direction of their length with an intermittent motion timed to stop the chains when two successive bars are situated at opposite sides of the platens in operating positions defining a sheet receiving and a sheet working position respectively and timed to move the chains for the bar situated in the sheet receiving position to be moved through between the platens to the sheet working position when the platens are parted during the reciprocation of said one of the platens, each chain including in respect of each bar a link provided on the side facing the space between the chains with a guide element engaged by the adjacent end of the bar and dimensioned to guide the bar for rectilinear movement in the direction of the length of the link, resilient means provided between each link and the adjacent end of the bar and positioned to urge the bar along the guide elements towards one end thereof, at each of said operating positions of the bars there being provided a means cooperating to move the bar into a sheet registering position and comprising at at least one of said operating positions of the bars a pair of levers positioned one adjacent each end of the bar, each lever being connected to an actuating member cooperating to impart to the lever a pivotal operating and return movement timed so that substantially during the stationary and moving periods of the chains the free end of the lever is situated respectively in an operative position intercepting the path of travel of the bars and in a returned position clear of the path of travel of the bars, the levers being so situated that towards the end of their operating movement they engage the bar and move it along the guide elements against the action of the resilient means into a sheet registering position.

9. A press according to claim 8, said lever being connected to said actuating member for pivotal movement relative thereto about an axis parallel to the length of the bars, and said lever being provided with a bell crank extension pivotally connected at the end remote from the lever to a retaining member cooperating to retain said end of the extension in a substantially stationary position, and wherein there are provided means for reciprocating the actuating member in a direction substantially at right angles to the plane of movement of the bars, the reciprocating movement of the actuating member and the connection of the extension to the retaining member combining to generate the operating and return movement of the lever.

10. A press according to claim 9, wherein means are provided for moving the retaining member in a direction substantially parallel to the direction of movement of the actuating member thereby to vary the operative position of the lever.

References Cited in the file of this patent

UNITED STATES PATENTS

| | | |
|---|---|---|
| 2,425,680 | Kaddeland | Aug. 12, 1947 |
| 2,512,084 | Bobst | June 20, 1950 |
| 2,756,995 | Koch | July 31, 1956 |
| 2,775,934 | Luehrs et al. | Jan. 1, 1957 |
| 2,850,280 | Kalbermatten | Sept. 2, 1958 |